F. A. HUNTINGTON & J. F. CARTER.
Improvement in Baling-Presses.

No. 126,394. Patented May 7, 1872.

Witnesses.
Geo. H. Strong.
A. J. Dewey.

Inventors
Frank A. Huntington,
John F. Carter
by his attys:
A. H. & R. K. Evans.

126,394

UNITED STATES PATENT OFFICE.

FRANK A. HUNTINGTON AND JOHN F. CARTER, OF SAN FRANCISCO, CAL.

IMPROVEMENT IN BALING-PRESSES.

Specification forming part of Letters Patent No. 126,394, dated May 7, 1872; antedated April 24, 1872.

SPECIFICATION.

*To all to whom it may concern:*

Be it known that we, F. A. HUNTINGTON and JOHN F. CARTER, of city and county of San Francisco, State of California, have invented an Improved Baling-Press; and we do hereby declare the following description and accompanying drawing are sufficient to enable any person skilled in the art or science to which it most nearly appertains to make and use our said invention or improvements without further invention or experiment.

The object of our invention is to provide an improvement in presses for baling hay, straw, wool, cotton, and other balable substances; and it consists mainly in the combination of a single horizontal baling-chamber with a follower, which is operated by a toggle or knee lever without the intervention of any gearing or other machinery. It also consists in a novel construction of the sides of the chamber and the end door and its fastening for strength and facility of discharge.

Figure 1:
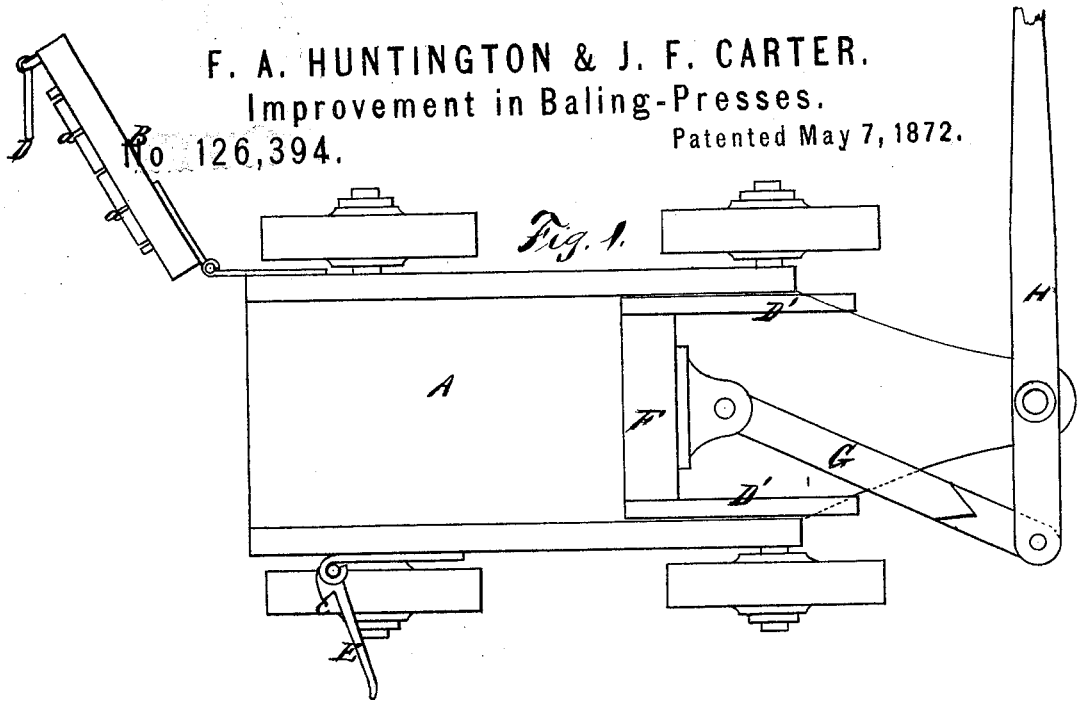
Figure 2:
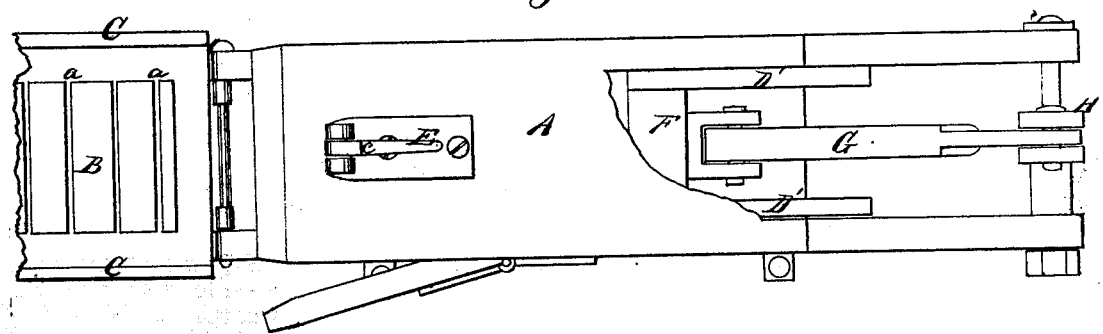
Figure 3:
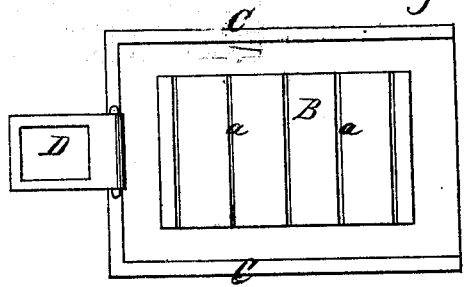

Referring to the accompanying drawing for a more complete explanation of our invention, Figure 1 is a side elevation of our press. Fig. 2 is a horizontal section.

Similar letters in each of the drawings indicate like parts.

A is the chamber of a single baling-press, and it is preferably mounted upon wheels so as to be easily moved. This chamber is of sufficient length to admit the quantity of hay necessary for a bale, and this is pitched into an end door, B. This door is formed in any suitable manner so as to have a flange or rim, C, to inclose and hold securely the sides of the chamber, which are slightly beveled. We prefer to make this flange of cast or angle iron, for strength, and the door is so hinged that this flange incloses the side and top walls of the baling-chamber when the door is closed. The walls of the chamber are either made elastic or they may be hinged a short distance back from the end, and this allows of their separating somewhat, so that the bale can be easily withdrawn after the end door is opened. The usual openings are made for the tying-cords, as shown at *a*. The door is secured by means of a hasp or latch, D, secured to one side of it, and a sort of cam-lever, E, which is secured to one side of the chamber. The latch hooks on a small projecting catch, C, on the lever when it is standing out from the body of the press, as in Fig. 1; and by drawing the lever down against the side it draws the latch tight and secures the door. The follower F is made so as to move easily in the chamber A, and has guiding-bars D' at the sides. A lever, G, is hinged to the center at the back end, and extends out to a point, where it is pinned to the end of a lever, H. This lever has its fulcrum in an extension of the press, and the horse is attached to its outer end.

The operation is as follows: The end door being open and the follower drawn back, sufficient hay is thrown in to form a bale and the door closed and secured, as before described. The horse is then started and moves until the lever stands in a line with the body of the press. When the follower first starts its speed will be considerable, as the leverage is smaller; but as the levers come nearer in a line with each other the material will be more firmly compressed and offer a greater resistance as the levers have a greater power, till, at the point where the horse stops and the levers are in a line, the greatest power and compression are obtained. The bale is then tied and the door B thrown open. This allows the elastic sides to spread slightly, and the bale falls out, and the horse, continuing his course, draws the follower back for another bale.

By this arrangement we are enabled to construct a cheap and convenient baling-press.

Having thus described our invention, we desire to secure by Letters Patent—

1. The combination of the lever or sweep H with the lever G, follower F, and box A of a baling-press, when constructed to operate substantially as herein described.

2. In combination with the elastic or hinged sides of the press-chamber A, we claim the flanged end door B, substantially as herein described.

3. The cam-lever E with its projecting hook C, as shown, in combination with the latch D of the door and the press-box A, substantially as herein described.

In witness whereof we hereunto set our hands and seals.

FRANK A. HUNTINGTON. [L. S.]
JOHN F. CARTER. [L. S.]

Witnesses:
GEO. H. STRONG,
A. T. DEWEY.